United States Patent
Pizzoni et al.

(10) Patent No.: US 9,774,227 B2
(45) Date of Patent: Sep. 26, 2017

(54) LINEAR ELECTRO-MECHANICAL ACTUATOR

(71) Applicant: UMBRA CUSCINETTI S.P.A., Foligno (PG) (IT)

(72) Inventors: Luciano Pizzoni, Foligno (IT); Romano Beffa, Perugia (IT); Riccardo Maccaglia, Montecastrilli (IT); Nicola Borgarelli, Perugia (IT); Raffaele Picone, Foligno (IT)

(73) Assignee: UMBRA CUSCINETTI S.P.A., Foligno (IT)

( * ) Notice: Subject to any disclaimer, the term of this patent is extended or adjusted under 35 U.S.C. 154(b) by 365 days.

(21) Appl. No.: 14/439,701

(22) PCT Filed: Nov. 12, 2013

(86) PCT No.: PCT/IT2013/000312
§ 371 (c)(1),
(2) Date: Apr. 30, 2015

(87) PCT Pub. No.: WO2014/076722
PCT Pub. Date: May 22, 2014

(65) Prior Publication Data
US 2015/0295468 A1    Oct. 15, 2015

(30) Foreign Application Priority Data
Nov. 15, 2012  (IT) .............. RM2012A0562

(51) Int. Cl.
*H02K 7/06*  (2006.01)
*F16H 25/20*  (2006.01)
*F16H 25/22*  (2006.01)

(52) U.S. Cl.
CPC .............. *H02K 7/06* (2013.01); *F16H 25/20* (2013.01); *F16H 25/2204* (2013.01); *F16H 2025/204* (2013.01); *F16H 2025/2078* (2013.01)

(58) Field of Classification Search
CPC ........ H02K 7/06; F16H 25/20; F16H 25/2204
(Continued)

(56) References Cited

U.S. PATENT DOCUMENTS 3,404,580 A * 10/1968 Valenti ................ F16H 25/2056
                                                    74/89.35
5,094,118 A *  3/1992 Morita .................... B25J 9/102
                                                    74/89.31
(Continued)

FOREIGN PATENT DOCUMENTS

DE  202008001576 U1  4/2008
EP       1134444 A2  9/2001
(Continued)

OTHER PUBLICATIONS

International Search Report, dated Apr. 30, 2014, from corresponding PCT application.

*Primary Examiner* — Thomas Dougherty
*Assistant Examiner* — Karen B Addison
(74) *Attorney, Agent, or Firm* — Young & Thompson

(57) ABSTRACT

A linear electro-mechanical actuator includes a containment structure (2), a nut (5) positioned in the containment structure (2), a screw shaft (6) inserted in the nut (5) and interconnected with the nut (5) via a helical recirculating ball coupling, and an anti-rotation mechanism (9) positioned inside the screw shaft (6) to prevent the screw shaft (6) from rotating about the axis (X). The anti-rotation mechanism (9)
(Continued)

includes a guide unit (10) fixed cantilever-style to the containment structure (2) and connected to the screw shaft by a non-rotational coupling.

9 Claims, 5 Drawing Sheets

(58) Field of Classification Search
 USPC ....... 310/80, 90, 91, 12.31, 12.19, 348, 311,
 310/15; 74/89.23, 89.37
 See application file for complete search history.

(56) References Cited

U.S. PATENT DOCUMENTS

| | | | | |
|---|---|---|---|---|
| 2003/0066598 A1* | 4/2003 | Tirinnanzi | ............... | B27N 7/00 |
| | | | | 156/256 |
| 2003/0145668 A1* | 8/2003 | Shimada | ............. | F16H 25/2204 |
| | | | | 74/89.32 |
| 2011/0111867 A1* | 5/2011 | Koyagi | ............... | F16C 29/0695 |
| | | | | 464/168 |
| 2011/0234021 A1* | 9/2011 | Eckstein | ................ | F16H 25/20 |
| | | | | 310/12.31 |

FOREIGN PATENT DOCUMENTS

| | | | |
|---|---|---|---|
| EP | 1312833 | A1 | 5/2003 |
| EP | 1548327 | A1 | 6/2005 |
| EP | 2299131 | A1 | 3/2011 |
| FR | 2960515 | A1 | 12/2011 |

\* cited by examiner

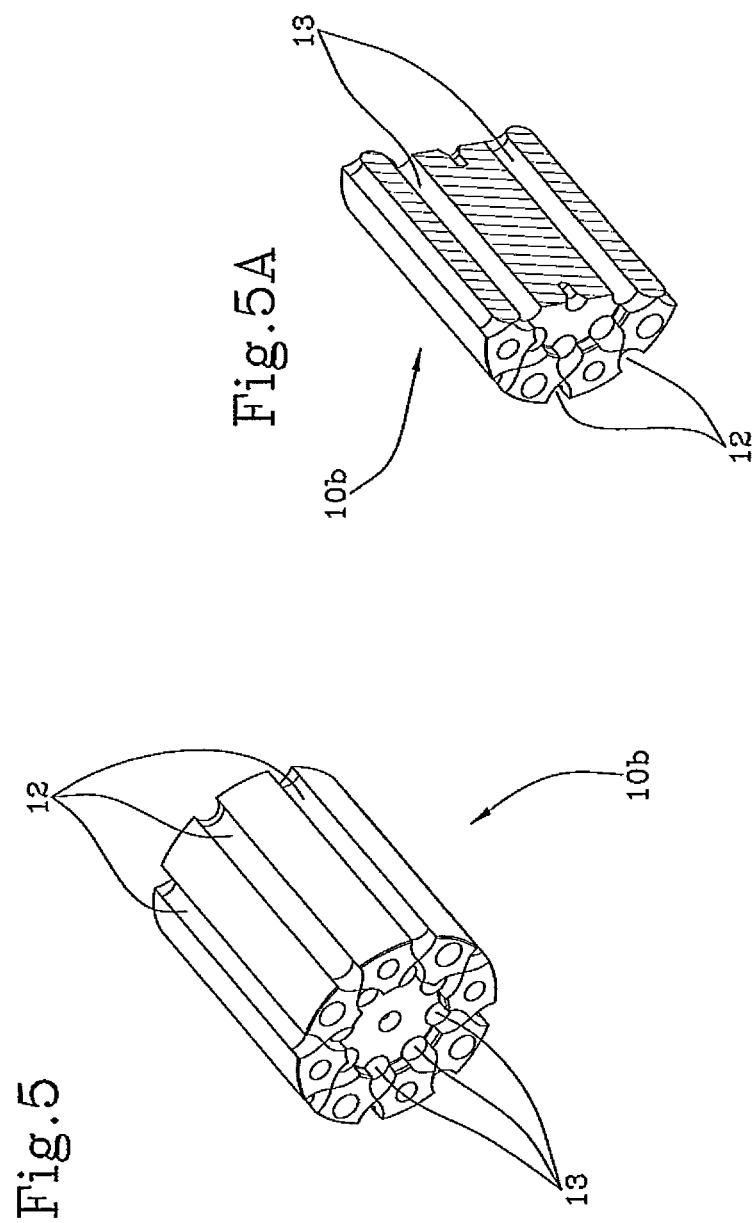

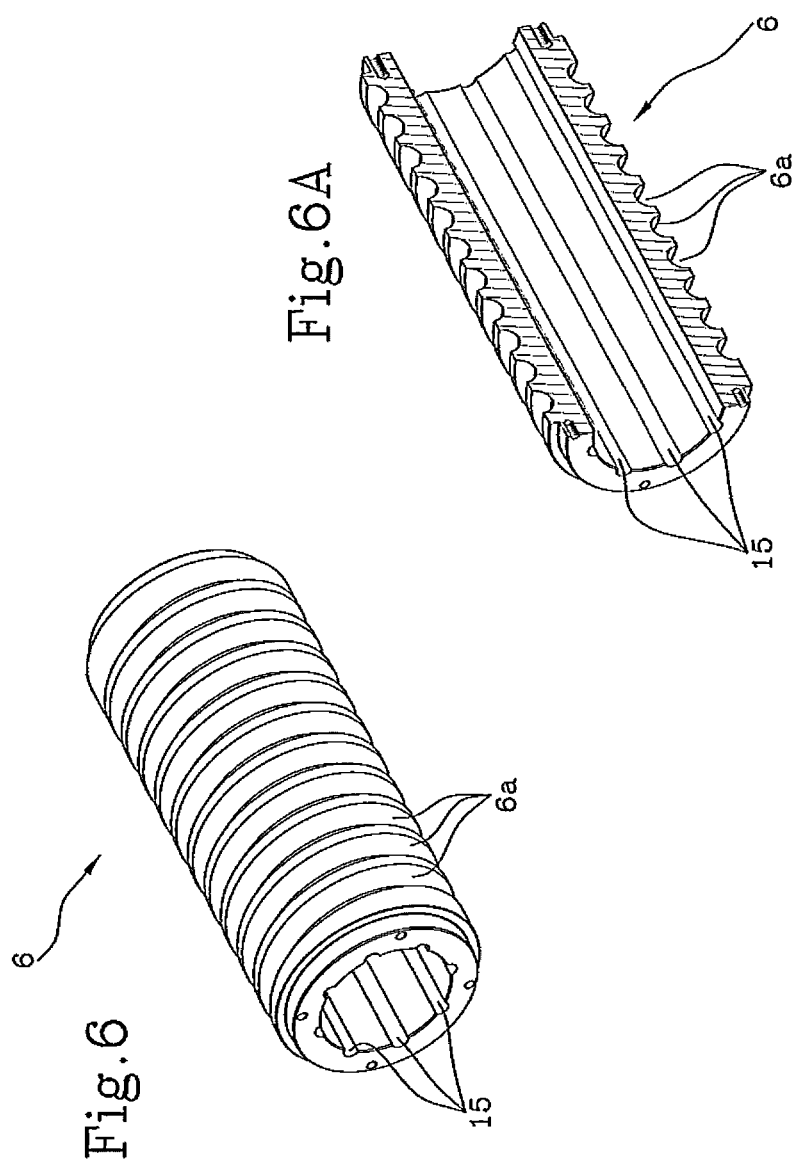

LINEAR ELECTRO-MECHANICAL ACTUATOR

TECHNICAL FIELD

This invention relates to a linear electro-mechanical actuator, in particular of the recirculating ball type.

Linear electro-mechanical actuators usually have an electric motor whose stator is connected to a screw device (for example of the recirculating ball type) designed to transform the rotary movement of the rotor into a linear advancing movement of a pusher forming part of the screw device.

So that the above-mentioned pusher (translating element of the screw device) can be provided with only linear translating motion, the linear electro-mechanical actuator must be equipped with an anti-rotation system which, for the equilibrium of the forces, balances the torque generated by the electric motor.

BACKGROUND ART

Prior art anti-rotation systems are described, for example, in the patent publications JP2002-54708 and JP59-19762 and DE202008001576U and use anti-rotation structures forming part of the actuator or stably connected to it.

The traditional anti-rotation systems have the following limitations:
  they are highly susceptible to misalignment between the actuator and the structure where the anti-rotation is performed; in particular, in all those applications with high operational loads and continuous operating conditions, the misalignments between actuator and anti-rotation structure generate transversal loads on the actuator which can lead to a malfunction of the device, a rapid deterioration of its performance and, therefore, a low reliability of the system;
  all those applications with high operational loads and continuous operating conditions require large radial and longitudinal dimensions necessary for containing an anti-rotation structure which is sufficiently robust to satisfy the load capacity and duration requirements needed by the application;
  anti-rotation systems of the sliding type are traditionally used where the pressures between the contact elements and the duration requirements are substantially reduced; in applications with high operational loads and continuous operating conditions, sliding type anti-rotations systems can lead to a rapid deterioration of the performance and, therefore, to a low reliability of the system.

DISCLOSURE OF THE INVENTION

The aim of this invention is therefore to provide a linear electro-mechanical actuator that overcomes the above-mentioned drawbacks of the prior art.

In particular, the aim of this invention is to provide a linear electro-mechanical actuator which has a high level of robustness and, at the same time, compact dimensions.

This aim is fulfilled by the linear electro-mechanical actuator according to this invention, as characterised in the appended claims.

BRIEF DESCRIPTION OF DRAWINGS

The technical features of the invention, with reference to the above aim, are clearly described in the appended claims and its advantages are more apparent from the detailed description which follows, with reference to the accompanying drawings which illustrate a non-limiting example embodiment of it, and in which:

FIGS. 3 to 6 are perspective views of different components of the anti-rotation system of FIG. 2;

FIGS. 5A and 6A are perspective views, shown partly in cross-section, of the components of FIGS. 5 and 6.

DETAILED DESCRIPTION OF THE PREFERRED EMBODIMENTS OF THE INVENTION

With reference to the accompanying drawings, the numeral 1 denotes in its entirety a linear electro-mechanical actuator according to the invention.

The actuator according to this description and as illustrated in the accompanying drawings is of the single-acting type, however, the inventive concept could also be applied to an actuator of the double-acting type.

Figure 1:
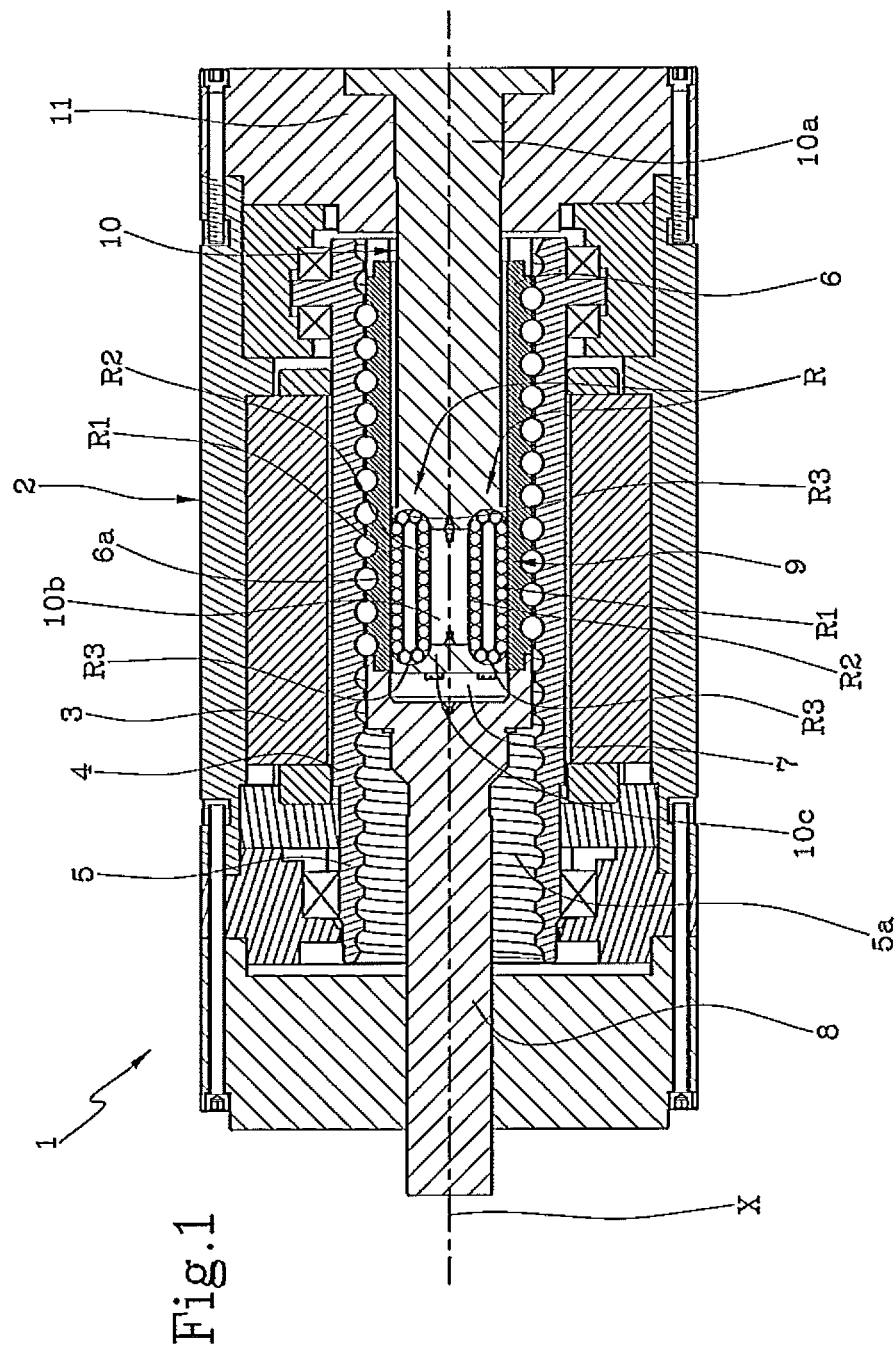
FIG. 1 is a sectional view, along a longitudinal plane, of an electro-mechanical actuator according to this invention.

As shown in FIG. 1, the actuator 1 comprises a rigid containment structure 2 housing an electric motor, in particular an outer stator 3 and a rotor 4 positioned inside the stator 3.

Inside the rotor 4, and in rigid connection with it, there is a nut 5 having an axis of rotation "X" which coincides with the axis of the rotor 4. The nut 5 is therefore rotated by the electromagnetic interaction between rotor 4 (usually of the permanent magnets type) and stator 3.

In the embodiment illustrated, the nut 5 has a main line of extension coinciding with the above-mentioned axis "X".

The nut 5 is only enabled for rotating about the axis "X", and is prevented from translating along the axis "X" for example by special locking shoulders or other known solutions.

Inside the nut 5 there is a screw shaft 6 which extends about an axis coinciding with the axis "X".

The screw shaft 6 is interconnected with the nut 5 by means of a helical coupling, preferably of the recirculating ball type (but which could also be of a different type, for example of the male-and-female screw, satellite rollers, recirculating rollers type) in such a way that a mutual rotation between nut 5 and screw shaft 6 causes a mutual translation of them along the axis "X".

In the embodiment illustrated in the accompanying drawings, and as can be seen in FIG. 1, both the inner surface of the nut 5 and the outer surface of the screw shaft 6 have respective helical grooves 5a, 6a designed for mutual engaging.

The screw shaft 6 also comprises an inner cavity 7, preferably a through hole, extending along the above-mentioned axis "X" and giving at least part of the screw shaft 6 a tubular shape for reasons which will be illustrated below. Said cavity 7, or through hole, therefore affects a central part of the screw shaft 6 located at the axis "X".

At one axial end, the screw shaft 6 is stably connected to a pusher 8 forming the active element of the actuator 1. In particular, the pusher 8 passes through a special opening of the containment structure 2 to come out of the latter and it can be translated together with the screw shaft 6 to define a plurality of operating positions along the axis "X".

The actuator 1 also comprises an anti-rotation mechanism 9 acting on the screw shaft 6 to prevent the screw shaft 6 from rotating about the axis "X".

In other words, the anti-rotation mechanism 9 keeps the screw shaft 6 rotationally fixed during rotation of the nut 5 in such a way that the rotation of the nut 5 causes the translation of the screw shaft 6 along the axis "X".

The anti-rotation mechanism 9 is however shaped in such a way as to guide, at the same time, in a fluid and precise fashion the screw shaft 6 translating along the axis "X".

According to this invention, the anti-rotation mechanism 9 comprises a guide unit 10 inserted in the above-mentioned cavity 7 (or through hole) in the screw shaft 6 and coupled in a non-rotational fashion to the self-same screw shaft 6.

The guide unit 10 is housed in the containment structure 2 in such a way that it is positioned on the axis "X", in particular positioned parallel and coaxial with the axis "X".

The guide unit 10 is fixed cantilever-style to the containment structure 2, for example to a suitable supporting flange 11 made on a head of the containment structure 2 (as shown in FIG. 1). Said supporting flange 11 is positioned transversally to the axis "X" and may be required to hold together in a pack the various components of which the actuator 1 consists.

Preferably, for simple assembly, the cavity 7 of the screw shaft 6 must be accessible at least from the side opposite that on which the pusher 8 is mounted, in such a way as to allow the cantilever-style mounting of the guide unit 10 inserted in the cavity 7.

However, preferably the cavity 7 is accessible from both sides, and therefore consists of a single through hole.

Figure 2:
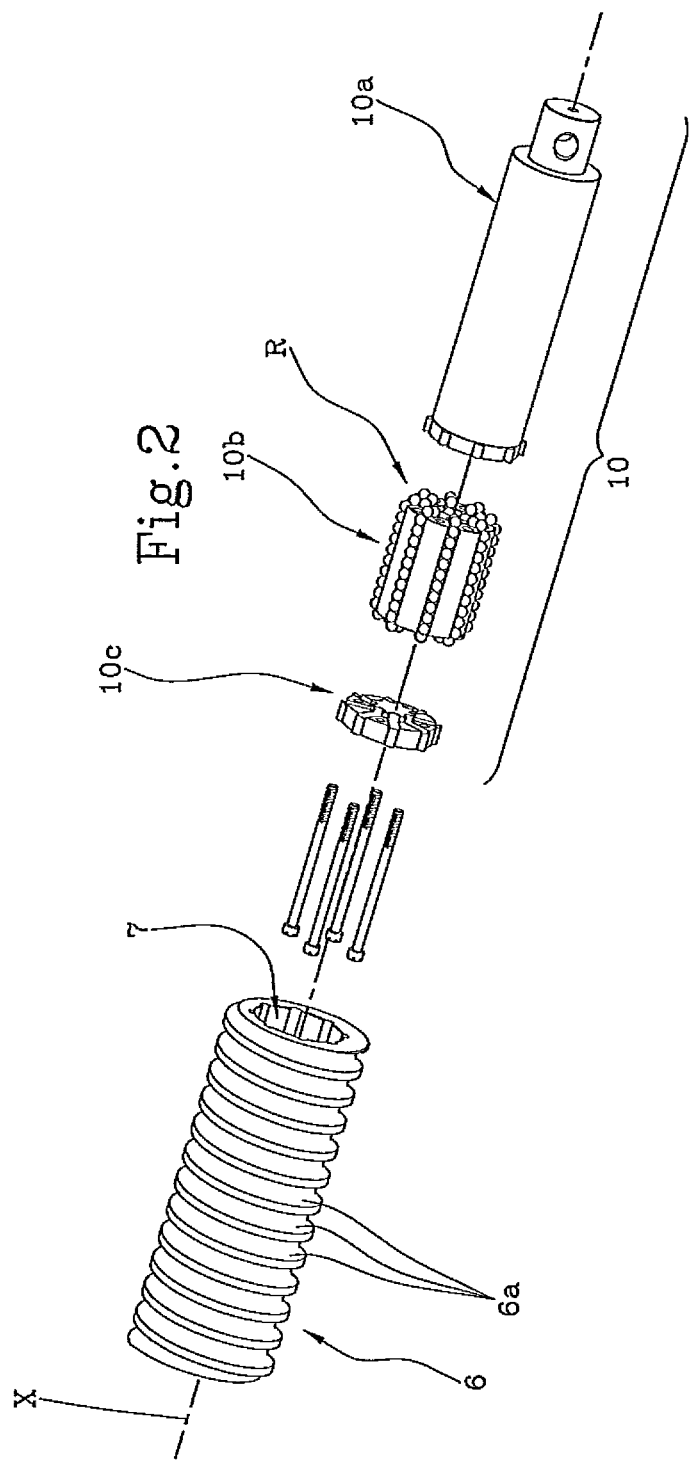
FIG. 2 is an exploded view of the anti-rotation system present in the actuator of FIG. 1.

Preferably, as shown in FIGS. 1 and 2, the guide unit 10 is coupled in a non-rotational fashion to the screw shaft 6 by means of a recirculating ball coupling "R" designed to allow a translation of the screw shaft 6 relative to the guide unit 10 along the axis "X".

In more detail, said recirculating ball coupling "R" extends on a closed path comprising a first stretch "R1" parallel with the axis and interposed between the guide unit 10 and the screw shaft 6, a second stretch "R2" made inside the guide unit 10 for the recirculation of the balls, and a pair of opposite third stretches "R3" connecting the first and second stretches "R1", "R2".

In particular, the guide unit 10 comprises:
a first portion 10a fixed to the containment structure 2 of the actuator 1;
a second portion 10b removably connected to the first portion 10a and comprising longitudinal outer grooves 12, forming the above-mentioned first stretch "R1" of the closed path, and inner channels 13 for recirculation of the balls forming the above-mentioned second stretch "R2" of the closed path; and
a third portion "10c" removably fixed to the second portion 10b.

In the specific embodiment illustrated, as shown in FIGS. 5 and 5A, the second portion 10b of the guide unit 10 comprises a plurality of inner channels 13 (for example eight in number, as illustrated) angularly equidistant about the axis "X" and a plurality of outer grooves 12 (also for example eight in number, as illustrated), which are parallel with the axis "X" and also angularly equidistant about the axis "X". Preferably, each surface groove 12 and the respective inner channel 13 are aligned in the same radial plane passing through the axis "X".

Moreover, the above-mentioned the first and third portions 10a, 10c comprise, on a respective interface with the second portion 10b, diverter elements 14 shaped (for example curved) for conveying the balls between each inner channel 13 and a respective surface groove 12.

The screw shaft 6 (FIGS. 6, 6A) comprises a plurality of inner grooves 15, parallel with the axis "X" and facing towards the respective outer grooves 12 to form, in conjunction with the latter, a plurality of rolling channels for the balls designed to keep fixed the reciprocal angular orientation between the guide unit 10 and the screw shaft 6.

Preferably, the length of the inner grooves 15 of the screw shaft 6 along the axis "X" is greater than a length of the second portion 10b of the guide unit 10.

Figure 3:
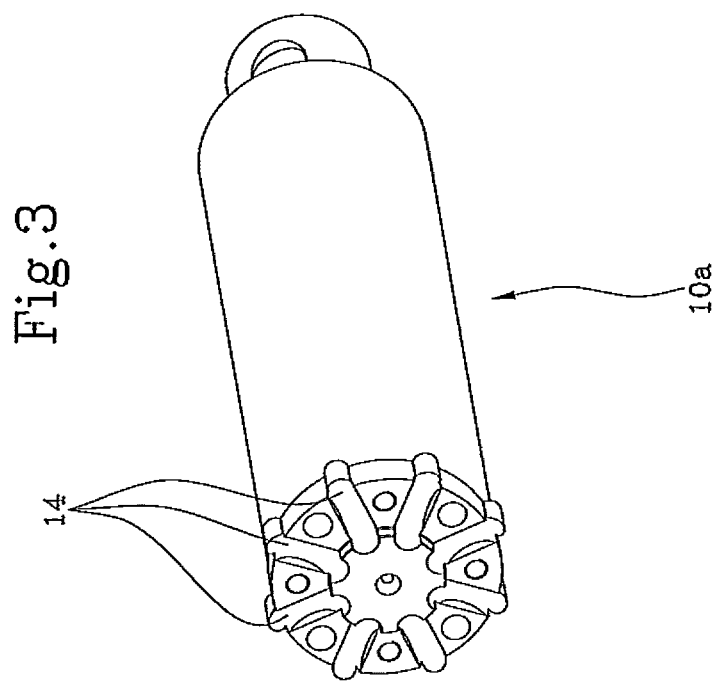

The first portion 10a of the guide unit 10 (FIG. 3) preferably has a main dimension of extension which coincides with the axis "X", and is preferably cylindrical, in such a way that it can be inserted in the cavity 7 in at least one operating configuration of the actuator 1. In particular, observing FIG. 1, it may be clearly inferred that at least in a pusher 8 fully retracted configuration the screw shaft 6 surrounds the first portion 10a of the guide unit 10.

Preferably, the radial dimension (that is to say transversal to the axis "X") of the first portion 10a of the guide unit 10 is less than the corresponding dimension of the cavity 7, in such a way as to avoid any interference between the outer surface (which has no ball recirculation) of said first portion 10a and the screw shaft 6 as the latter runs along the axis "X".

Figure 4:
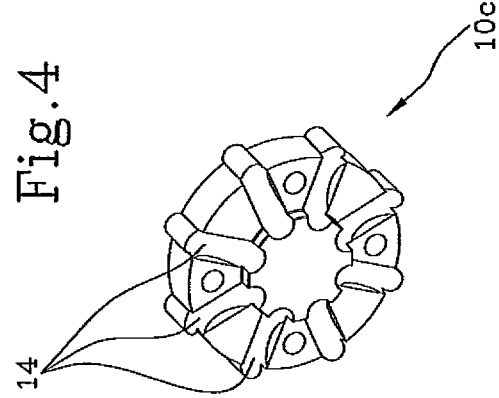

As shown in FIG. 4, the third portion 10c of the guide unit 10 has a reduced dimension along the axis "X", such that the third portion 10c is configured as a closing "cap" of the inner channels 13 of the second portion 10b. Therefore, the third portion 10c is applied to one end of the second portion 10b and is connected to it cantilever-style.

Preferably, as shown in FIG. 1, the recirculating ball coupling "R" is positioned axially along the axis "X" of the nut 5 in a position enclosed within an axial dimension of the stator 3/rotor 4, preferably centred relative to the stator 3/rotor 4.

In that configuration, the recirculating ball coupling "R" may apply a guiding and supporting action axially aligned with the zone in which the driving action of the electric motor is discharged.

According to one embodiment, as illustrated in the accompanying drawings, in at least one operating configuration the recirculating ball coupling "R" extends inside the screw shaft 6 over a longitudinal stretch of the latter in which it is at least partly superposed by (and preferably entirely superposed by) the respective outer helical groove 6a. That means that the recirculating ball coupling "R" applies a screw shaft 6 guiding and supporting action directly in a stretch of the screw shaft 6 which exchanges a mechanical action with the nut 5 (through a further caged recirculation of balls between the above-mentioned helical grooves 5a, 6a of the nut 5 and of the screw shaft 6), therefore centred with said mechanical action.

However, in a different embodiment, the recirculating ball coupling "R" could also extend, longitudinally, outside the respective outer helical groove 6a.

Moreover, in accordance with an embodiment not illustrated but which is in any case covered by the inventive concept, the screw shaft 6 is formed by two parts longitudinally placed side by side along the axis "X", a first of which is inserted in the nut 5 and interconnected with it by means of a helical coupling, the second being coupled in a sliding and non-rotational fashion to the guide unit 10. In particular, on the inside of the second part of the screw shaft 6 there is the cavity 7 for housing the guide unit 10. The two parts of the screw shaft 6 are rigidly connected to one another in such a way that the second part transmits the non-rotational guiding action to the first part of the screw shaft 6. Therefore, in that configuration the anti-rotation mechanism 9 is axially distanced, along the axis "X", from the coupling between the screw shaft 6 and the nut 5.

This invention achieves the preset aim by overcoming the above-mentioned disadvantages of the prior art.

In fact, the actuator according to the invention has a greater load capacity, the dimensions being equal to those of the prior art solutions. In traditional recirculating ball sleeves it is a bushing with a recirculating system that translates on a shaft with longitudinal grooves, and in that solution the diameter on which the locking torque acts is noticeably smaller. In the solution developed and described above, since the fixed element (guide unit) is inside the screw shaft, the diameter on which the locking torque acts is much greater, therefore reducing the tangential stress on the balls and so the contact pressures. The result is an increased load capacity, the dimensions being equal, with a longer predicted lifetime for the actuator and therefore improved reliability.

Moreover, the guide unit acts coaxially with the axis of rotation of the actuator, minimising any misalignment between the screw shaft, anti-rotation system and nut. This allows the cancelling out of any extremely high lateral loads which could substantially modify the distribution of the load on the balls between the screw shaft and the nut and between the screw shaft and the anti-rotation mechanism, compromising correct operation of the actuator.

Moreover, the actuator according to the invention optimises the load distribution on the balls of the anti-rotation mechanism. In fact:

the guide unit, acting coaxially to the axis of rotation of the nut, minimises any misalignment between the screw shaft, anti-rotation mechanism and nut; this allows optimisation and uniformity of load distribution on the balls of the anti-rotation mechanism and of the coupling between the screw shaft and the nut;

since the diameter of the guide unit can be maximised, it is possible to reduce its length, obtaining a much more compact and rigid solution with consequent improvement of the load distribution on the balls of the anti-rotation mechanism.

That architecture of the anti-rotation system allows radial and axial dimensions to be minimised, at the same time maximising load capacities. In particular, the total length of the actuator is particularly compact and is in no way affected by the presence of the anti-rotation mechanism.

Moreover, the architecture of the anti-rotation system favours oil bath lubrication.

The high level of reliability of such architecture together with strict life requirements for linear actuators mean that the invention presented herein is particularly suited to application as reciprocating pumps.

The invention claimed is:
1. A linear electro-mechanical actuator, comprising:
a containment structure (2);
a pusher (8) designed to translate relative to the containment structure (2) in such a way that it at least partly comes out of the containment structure (2) during actuator (1) operation;
a nut (5) located in the containment structure (2) and able to rotate about an axis (X) driven by a driving force;
a screw shaft (6) inserted in the nut (5) and connected to the pusher (8), said screw shaft (6) being interconnected with the nut (5) by means of a helical recirculating ball coupling in such a way that a rotation of the nut (5) causes a translation of the screw shaft (6) along said axis (X);
an anti-rotation mechanism (9) acting on the screw shaft (6) to prevent the screw shaft (6) from rotating about said axis (X);
wherein said screw shaft (6) comprises a cavity (7) positioned about the axis (X) and wherein said anti-rotation mechanism (9) comprises a guide unit (10) fixed to the containment structure (2) and inserted in said cavity (7) in the screw shaft (6), said guide unit (10) being coupled in a non-rotational fashion to the screw shaft (6);
wherein said guide unit (10) is coupled in a non-rotational fashion to the screw shaft (6) by means of a recirculating ball coupling (R) designed to allow a translation of the screw shaft (6) relative to the guide unit (10) along the axis (X), and wherein the recirculating ball coupling (R) extends on a closed path comprising a first stretch (R1) parallel with the axis (X) and interposed between the guide unit (9) and the screw shaft (6), for forming a sliding coupling between the guide unit (9) and the screw shaft (6), and a second stretch (R2) made inside the guide unit (9) for the recirculation of the balls, and a pair of third stretches (R3) connecting the first and second stretches (R1, R2),
characterised in that the guide unit (10) comprises:
a first portion (10*a*) fixed to the containment structure (2);
a second portion (10*b*) removably connected to the first portion (10*a*) and comprising longitudinal outer grooves (12), forming said first stretch (R1) of the closed path, and inner channels (13) for recirculation of the balls forming the second stretch (R2) of the closed path; and
a third portion (10*c*) removably fixed to the second portion (10*b*);
and wherein the first and third portions (10*a*, 10*c*) comprise, on a respective interface with the second portion (10*b*), diverter elements (14) for conveying the balls between each inner channel (13) and a respective longitudinal outer groove (12).

2. The actuator according to claim 1, wherein the containment structure (2) comprises a supporting flange (11) positioned transversally to the axis (X) and wherein the guide unit (10) is fixed cantilever-style to the supporting flange (11).

3. The actuator according to claim 1, wherein the first portion (10*a*) of the guide unit (10) has substantially cylindrical extension and, in at least one operating configuration of the actuator (1), is inserted in the cavity (7) in the screw shaft (6).

4. The actuator according to claim 1, wherein the guide unit (10) extends along an axis coinciding with the axis (X) of rotation of the nut (5).

5. The actuator according to claim 1, also comprising an electric motor comprising a stator (3) fixed to the containment structure (2) and a rotor (4) fixed to the nut (5); the recirculating ball coupling (R) being positioned axially along the axis (X) of the nut (5) in a position enclosed within an axial dimension of the stator (3), preferably centred relative to the stator (3).

6. The actuator according to claim 1, wherein the outside of the screw shaft (6) comprises a helical groove (6*a*) for connection with the nut (5), and wherein, in at least one operating configuration, said recirculating ball coupling (R) comprises a longitudinal dimension, along the axis (X), which is partly superposed by a longitudinal extension of the helical groove (6*a*).

7. The actuator according to claim 1, wherein the inside of the screw shaft (6) comprises a plurality of longitudinal grooves (15) whose length, along the axis (X) of the nut (5), is greater than a corresponding length of the second portion (10*b*) of the guide unit (10).

8. The actuator according to claim 2, wherein the guide unit (10) extends along an axis coinciding with the axis (X) of rotation of the nut (5).

9. The actuator according to claim 3, wherein the guide unit (10) extends along an axis coinciding with the axis (X) of rotation of the nut (5).

\* \* \* \* \*